US012698427B2

(12) United States Patent
Sahni et al.

(10) Patent No.: US 12,698,427 B2
(45) Date of Patent: Aug. 4, 2026

(54) COMPOSITION COMPRISING STYRENE ISOPRENE BLOCK COPOLYMER AND ETHYLENICALLY UNSATURATED MONOMER

(71) Applicant: 3M INNOVATIVE PROPERTIES COMPANY, St. Paul, MN (US)

(72) Inventors: Vasav Sahni, St. Paul, MN (US); Richard B. Ross, Cottage Grove, MN (US); Saswata Chakraborty, Sunnyvale, CA (US); Wayne S. Mahoney, St. Paul, MN (US); Jason D. Clapper, Lino Lakes, MN (US); Jacob P. Johnson, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 752 days.

(21) Appl. No.: 17/604,530

(22) PCT Filed: May 19, 2020

(86) PCT No.: PCT/IB2020/054747
§ 371 (c)(1),
(2) Date: Oct. 18, 2021

(87) PCT Pub. No.: WO2020/234776
PCT Pub. Date: Nov. 26, 2020

(65) Prior Publication Data

US 2022/0195266 A1 Jun. 23, 2022

Related U.S. Application Data

(60) Provisional application No. 62/851,281, filed on May 22, 2019.

(51) Int. Cl.
*C09J 153/02* (2006.01)

(52) U.S. Cl.
CPC .................................. *C09J 153/02* (2013.01)

(58) Field of Classification Search
CPC ...... C09J 153/02; C08F 287/00; C08F 220/18
See application file for complete search history.

(56) References Cited

U.S. PATENT DOCUMENTS

| | | | |
|---|---|---|---|
| 5,238,623 | A | 8/1993 | Mrozinski |
| 8,232,350 | B2 | 7/2012 | Fujita |
| 8,299,177 | B2 | 10/2012 | Wright et al. |
| 8,419,890 | B2 | 4/2013 | Curet |
| 8,460,969 | B2 | 6/2013 | Krawinkel |
| 8,557,084 | B2 | 10/2013 | Keite-Telgenbuescher |
| 8,747,703 | B2 | 6/2014 | Sasaki et al. |
| 8,771,459 | B2 | 7/2014 | Keite-Telgenbuescher |
| 9,487,684 | B2 | 11/2016 | Krawinkel |
| 9,567,497 | B2 | 2/2017 | Kopf |
| 10,350,864 | B2 | 7/2019 | Oshima et al. |
| 10,717,905 | B2 | 7/2020 | Kopf |
| 2002/0016417 | A1 | 2/2002 | Yamaguchi et al. |
| 2008/0139734 | A1 | 6/2008 | Nakashima |
| 2008/0192098 | A1 | 8/2008 | Tsuru et al. |
| 2008/0221291 | A1 | 9/2008 | Invie |
| 2009/0026924 | A1 | 1/2009 | Leung |
| 2009/0026934 | A1 | 1/2009 | Fujita |
| 2009/0087591 | A1* | 4/2009 | Larson .................. H05K 3/323 174/254 |
| 2011/0292493 | A1 | 12/2011 | Danner |
| 2012/0021215 | A1* | 1/2012 | Burch ....................... C09J 7/38 428/354 |
| 2012/0122359 | A1 | 5/2012 | Lee |
| 2012/0128966 | A1 | 5/2012 | Ma |
| 2013/0207922 | A1 | 8/2013 | Gillmore |
| 2013/0266762 | A1* | 10/2013 | Mayers ................ G02B 3/0006 427/372.2 |
| 2014/0141271 | A1 | 5/2014 | Uemura |
| 2014/0315016 | A1 | 10/2014 | Dollase |
| 2014/0322526 | A1 | 10/2014 | Dollase |
| 2014/0377554 | A1 | 12/2014 | Cho et al. |
| 2015/0056757 | A1 | 2/2015 | Liu |
| 2015/0090573 | A1 | 4/2015 | Mansky |

(Continued)

FOREIGN PATENT DOCUMENTS

| | | | |
|---|---|---|---|
| CN | 101155871 | A | 4/2008 |
| CN | 102725318 | A | 10/2012 |

(Continued)

OTHER PUBLICATIONS

Sigma-Aldrich Safety Data Sheet , Version 4.9, (2016) (Year: 2016).*
Chemical Book, CAC Database List (2023) (Year: 2023).*
Database Benzyl meth acrylate https://www.chemicalbook.com/ChemicalProductProperty_EN_CB7306028.htm#:~:text=2495%2D37%2D6%20Chemical%20Name,25%20%C2%B0C%20(lit.) (Year: 2023).*
Phenoxyethyl meth acrylate Log P https://www.chemicalbook.com/ChemicalProductProperty_EN_CB1398108.htm (Year: 2023).*
Bisphenol A dimethacrylate PubChem (3. Chemical and Physical Properties) https://pubchem.ncbi.nlm.nih.gov/compound/Bisphenol-A-dimethacrylate#section=Crystal-Structures (Year: 2004).*

(Continued)

*Primary Examiner* — Catherine S Branch
*Assistant Examiner* — Olga Lucia Donahue
(74) *Attorney, Agent, or Firm* — Carolyn A. Fischer

(57) ABSTRACT

Compositions are described comprising at least 20 wt. % of block copolymer comprising polyvinyl aromatic end blocks and a polyisoprene midblock and at least one ethylenically unsaturated monomer comprising one or more groups selected from (meth)acryl or vinyl ether. In one embodiment, the monomer has a Log P according to Moriguchi's method of at least 2.2. In another embodiment, the monomer is a multifunctional aromatic ethylenically unsaturated monomer. The composition is typically a (e.g. pressure sensitive) adhesive. Also described are methods of making an article, adhesive articles, and methods of bonding.

21 Claims, No Drawings

(56) References Cited

U.S. PATENT DOCUMENTS

| | | | |
|---|---|---|---|
| 2015/0240133 | A1 | 8/2015 | Nakayama |
| 2015/0299519 | A1 | 10/2015 | Nishijima |
| 2015/0299523 | A1 | 10/2015 | Park |
| 2016/0108305 | A1 | 4/2016 | Murphy |
| 2016/0200949 | A1 | 7/2016 | Lee |
| 2017/0015870 | A1 | 1/2017 | Nishijima |
| 2018/0171191 | A1 | 6/2018 | Kopf |
| 2020/0362157 | A1 | 11/2020 | Parkar et al. |
| 2021/0095056 | A1 | 4/2021 | Klun et al. |

FOREIGN PATENT DOCUMENTS

| | | | |
|---|---|---|---|
| CN | 103820043 | | 5/2014 |
| CN | 104169386 | A | 11/2014 |
| CN | 105593295 | A | 5/2016 |
| EP | 1431364 | | 6/2004 |
| EP | 2116583 | | 11/2009 |
| EP | 2832780 | | 2/2015 |
| EP | 2952528 | | 12/2015 |
| EP | 3050927 | | 8/2016 |
| EP | 3345946 | | 7/2018 |
| JP | 2008150550 | | 7/2008 |
| JP | 2009096839 | | 5/2009 |
| JP | 2010077384 | | 4/2010 |
| JP | 2010180324 | | 8/2010 |
| JP | 2010209168 | | 9/2010 |
| JP | 2017106015 | | 6/2017 |
| KR | 20150123995 | | 11/2015 |
| KR | 20160115150 | | 10/2016 |
| WO | 2006/106609 | A1 | 10/2006 |
| WO | WO 2008-112452 | | 9/2008 |
| WO | WO 2010-125124 | | 11/2010 |
| WO | WO 2012-158317 | | 11/2012 |
| WO | WO 2015-048293 | | 4/2015 |
| WO | WO 2015-141979 | | 9/2015 |
| WO | WO 2016-163152 | | 10/2016 |
| WO | WO 2017-014401 | | 1/2017 |
| WO | WO 2018-122748 | | 7/2018 |
| WO | WO 2018-178781 | | 10/2018 |
| WO | WO 2018-178850 | | 10/2018 |
| WO | WO 2019-021115 | | 1/2019 |
| WO | 2019168809 | A1 | 9/2019 |
| WO | WO 2019-168809 | | 9/2019 |
| WO | WO 2020-012329 | | 1/2020 |

OTHER PUBLICATIONS

PubChem database of (meth)acryloxydecyl dihydrogen phosphate (3. Chemical and Physical Properties https://pubchem.ncbi.nlm.nih.gov/compound/Methacryloyloxydecyl-dihydrogen-phosphate (Year: 2004).*

CN308, Technical Data Sheet, 1 page.

CN309, Hydrophobic Acrylate Ester, 2015, 1 page.

Database WPI Week 200934 Thomson Scientific, London, GB; an 2009-H96373 XP002795729, 2 pages.

Database WPI Week 201057 Thomson Scientific, London, GB; an 2010-K62346, XP002795730, 3 pages.

Griffin, "Calculation of HLB Values of Non-Ionic Surfactants", Journal of the Society of Cosmetic Chemists, Dec. 1954, vol. 5 No. 4, pp. 249-256.

Moriguchi, "Simple Method of Calculating Octanol/Water Partition Coefficient", Chemical and Pharmaceutical Bulletin, Jan. 1992, vol. 40, No. 1, pp. 127-130.

Park, "Curing Behavior and Adhesion Performance of UV-Curable Styrene-Isoprene-Styrene-Based Pressure-Sensitive Adhesives", Journal of Adhesion Science and Technology, 2008, vol. 22, No. 13, pp. 1401-1423.

International Search Report for PCT International Application No. PCT/IB2020/054747, mailed on Sep. 17, 2020, 4 pages.

International Search Report for PCT International Application No. PCT/IB2019/055798, mailed on Feb. 3, 2020, 7 pages.

High HomeProducts, et al., "Cumyl Phenoxyl Ethyl Acrylate/CPEA Cumyl Phenoxyl Ethyl Acrylate/CPEA Home Products About US Factory Tour Quality Control Contact Us Request A Quote", Dec. 31, 2022 (Dec. 31, 2022), XP093031063, Retrieved from the Internet: URL:https://www.develycn.com/sale-7836047-cumyl-phenoxyl-ethyl-acrylate-cpea.html.

* cited by examiner

COMPOSITION COMPRISING STYRENE ISOPRENE BLOCK COPOLYMER AND ETHYLENICALLY UNSATURATED MONOMER

SUMMARY

Compositions are described comprising at least 20 wt. % of block copolymer comprising polyvinyl aromatic end blocks and a polyisoprene midblock and at least one ethylenically unsaturated monomer comprising one or more groups selected from (meth)acryl or vinyl ether. In one embodiment, the monomer has a Log P according to Moriguchi's method of at least 2.2. In another embodiment, the monomer is a multifunctional aromatic ethylenically unsaturated monomer. The composition is typically a (e.g. pressure sensitive) adhesive.

In another embodiment, a method of making an article is described comprising providing a composition as described herein, applying the composition to a substrate, and curing the at least one ethylenically unsaturated monomer before or after applying the composition to the substrate.

In another embodiment, an article is described comprising a substrate and the composition described herein disposed on the substrate.

In another embodiment, a method of bonding is described comprising providing a composition as described herein bonding a substrate to a second substrate or surface with the composition.

DETAILED DESCRIPTION

The polystyrene-polyisoprene-polystyrene (SIS) block copolymer may have various structures including a linear A-B-A triblock block copolymers and (A-B)nX radial (e.g. multi-arm) block copolymer wherein A is a polyvinyl aromatic blocks, B is a conjugated diene block, n is an integer of at least 2 or 3, typically ranging up to 6, 7, 8, 9, 10, 11, or 12 and X is the residue of a coupling agent. The unsaturated midblock of the block copolymer can be tapered or non-tapered, but is typically non-tapered. As used herein, the terminology polystyrene-polyisoprene-polystyrene or SIS block copolymer refers to both the linear and radial (e.g. multi-arm) structures unless specified otherwise.

The polyvinyl aromatic block, A, may be any polyvinyl aromatic block known for block copolymers. The polyvinyl aromatic block is typically derived from the polymerization of vinyl aromatic monomers having 8 to 12 carbon atoms such as styrene, o-methylstyrene, p-methylstyrene, alpha-methylstyrene, p-tert-butylstyrene, 2,4-dimethylstyrene vinylnaphthalene, vinyltoluene, vinylxylene, vinylpyridine, ethylstyrene, t-butylstyrene, isopropylstyrene, dimethylstyrene, other alkylated styrenes, and mixtures thereof. Most typically, the polyvinyl aromatic block is derived from the polymerization of substantially pure styrene monomer or styrene monomer as a major component with minor concentrations of other vinyl aromatic monomers, as described above. The amount of other vinyl aromatic monomer(s) is typically no greater than 10, 9, 8, 7, 6, 5, 4, 3, 2, 1, or 0.5% by weight of the total amount of polymerized vinyl aromatic monomer.

In some embodiments, the polystyrene-polyisoprene-polystyrene block copolymer comprises little or no diblock. Thus, the diblock content is less than 10, 9, 8, 7, 6, 5, 4, 3, 2, or 1 wt. % based on the total weight of the second polystyrene-polyisoprene-polystyrene block copolymer.

In other embodiments, the SIS block copolymer further comprises appreciable amounts of A-B diblock wherein A is a polyvinyl aromatic block and B is a conjugated diene block. For example, the diblock content may be at least 15, 20, 25, or 30 wt. % of the total block copolymer.

In some embodiments, the diblock content of the block copolymer is typically no greater than 70, 60, 50, or 40 wt. % of the total second SIS block copolymer.

Various types of styrene-isoprene-styrene (SIS) block copolymers are commercially available, such as under the trade designation KRATON™ D.

In some embodiments, the SIS block copolymer has a number average molecular weight ranging from 25,000 to 250,000 g/mole. In some embodiments, the number average molecular weight of the SIS block copolymer is at least 30,000; 35,000 or 40,000 g/mole. In some embodiments, the number average molecular weight of the SIS block copolymer is no greater than 200,000, 175,000, 150,000, or 100,000 g/mole.

In other embodiments, the SIS block copolymer has a higher molecular weight. In some embodiments, the SIS block copolymer has a number average molecular weight of at least 300,000; 400,000; or 500,000 g/mol. In some embodiments, the SIS block copolymer has a number average molecular weight of at least 600,000; 700,000; 800,000; 900,000 or 1,000,000 g/mol. In some embodiments, the SIS block copolymer has a number average molecular weight of at least 1,250,000 or 1,500,000. The molecular weight of the SIS block copolymer is typically no greater than 1,750,000 or 2,000,000 g/mole.

In some embodiments, the molecular weight of the polyvinyl aromatic (e.g. polystyrene) end blocks of the SIS block copolymer is about the same and the block copolymer may be characterized as symmetrical. In other embodiments, the molecular weight of the polyvinyl aromatic (e.g. polystyrene) end blocks is different and the block copolymer may be characterized as asymmetrical. In some embodiments, the number average molecular weight of the lower molecular weight polyvinyl aromatic (e.g. polystyrene) end block is at least 1,000 to about 10,000 g/mole, typically from about 2,000 to about 9,000 g/mole, more typically between 4,000 and 7,000 g/mole. The number average molecular weight of the higher molecular weight polyvinyl aromatic (e.g. polystyrene) end block is in the range from about 5,000 to about 50,000 g/mole, typically from about 10,000 to about 35,000 g/mole.

In some embodiments, the number of arms of the block copolymer containing a higher molecular weight end block is at least 5, 10 or 15 percent of the total number of arms of the second block copolymer. In some embodiments, the number of arms containing a higher molecular weight end block is no greater than 70, 65, 60, 55, 50, 45, or 35 percent of the total number of arms of the block copolymer.

The asymmetrical block copolymer typically comprises from about 4 to 40 percent by weight of a polyvinyl aromatic monomer (e.g. polystyrene), and from about 96 to 60 percent by weight of a polymerized conjugated diene(s). In some embodiments, the asymmetrical block copolymer comprises from about 5 to 25 percent of a polymerized vinyl aromatic monomer (e.g. styrene) and from about 95 to 75 percent of a polymerized conjugated diene, and more typically from about 6 to 15 percent of a polymerized vinyl aromatic monomer and from about 94 to 85 percent of polymerized conjugated diene.

The composition can contain various ethylenically unsaturated (e.g. free-radically polymerizable) monomers that can provide various technical benefits. The ethylenically unsaturated monomer is a different monomer than use in the preparation of the SIS block copolymer. Thus, the ethylenically unsaturated monomer is not styrene or isoprene. The ethylenically unsaturated monomer typically comprises (meth)acryl or vinyl ether groups. The term "meth(acryl)" includes (meth)acrylate and (meth)acrylamide.

In some embodiments, the ethylenically unsaturated (e.g. free-radically polymerizable) monomer is monofunctional, comprising a single ethylenically unsaturated (e.g. free-radically polymerizable) group. In other embodiments, the monomer is multifunctional, comprising at least 2, 3, 4, 5, or 6 ethylenically unsaturated (e.g. free-radically polymerizable) groups. Suitable ethylenically unsaturated (e.g. free-radically polymerizable) groups include for example (meth) acrylate, (meth)acrylamide, vinyl ether groups, and alkenyl. The multifunctional monomers can comprise different ethylenically unsaturated (e.g. free-radically polymerizable) groups on the same monomer.

In typical embodiments, the molecular weight (Mn) of the ethylenically unsaturated monomer is at least 200 g/mole, 250 g/mole, 300 g/mole, 350 g/mole, 400 g/mole, or 450 g/mole. In typical embodiments, the molecular weight is less than 5000, 4500, 3000, 3500, 3000, 2500, 2000, or 1500 g/mole. As used herein, the term monomer also includes oligomers having a molecular weight up to 10,000 g/mole.

The composition can contain a single monofunctional monomer, a single multifunctional monomer, or various combinations thereof. The combinations can include at least two monofunctional monomers, at least two multifunctional monomers, as well as at least one monofunctional monomer(s) in combination with at least one multifunctional monomer(s).

The composition can contain a single aliphatic monomer, a single aromatic monomer, or various combinations thereof. The combinations can include at least two aliphatic monomers, at least two aromatic monomers, as well as at least one aliphatic monomer(s) in combination with at least one aromatic monomer(s).

The total amount of ethylenically unsaturated monomer can vary. For example, the composition may contain only a small amount of ethylenically unsaturated monomer for the purpose of adjusting the adhesion or cohesive strength of the composition. Higher concentrations may be used for the purpose of raising the refractive index. Thus, in some embodiments, the composition comprises at least 1, 2, 3, 4, or 5 wt.-% of ethylenically unsaturated monomer(s). In some embodiments, the composition comprises at least 6, 7, 8, 9, 10, 11, 12, 13, 14 or 15 wt.-% of ethylenically unsaturated monomer(s). The amount of ethylenically unsaturated monomer(s) is typically no greater than 50, 45, 40, 35, 30, 25, or 20 wt.-% of the composition.

In some embodiments, the ethylenically unsaturated (e.g. free-radically polymerizable) monomer is aliphatic. Aliphatic ethylenically unsaturated monomer have a lower refractive index than aromatic ethylenically unsaturated monomer. Aliphatic ethylenically unsaturated monomers, can usefully be employed to adjust the properties of the composition. For example, multifunctional monomers can be used to increase the cohesive strength.

In some embodiments, the aliphatic ethylenically unsaturated (e.g. free-radically polymerizable) monomers comprise a cyclic group. The number of carbon atoms of the aliphatic cyclic group is typically at least 10 ranging up to 20 or 30. In some embodiments, the aliphatic ethylenically unsaturated (e.g. free-radically polymerizable) monomer is polycyclic cycloalkane such as norbornane, adamantane, tricyclodecane, and tetracyclododecane or a polycyclic cycloalkene such as norbornene, tricyclodecene, and tetracyclododecene, and the like.

Specific examples of difunctional cycloaliphatic compounds can be represented by the following formula (I).

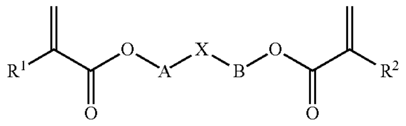

wherein X is a divalent polycyclic hydrocarbon group, as just described;

$R^1$ and $R^2$ are independently hydrogen or methyl; and

A and B are independently a covalent bond or an alkylene groups having at 1 to 10 carbon atoms and in some embodiments no greater 6, 5, 4, or 3 carbon atoms.

In favored embodiments, the ethylenically unsaturated (e.g. free-radically polymerizable) monomer is aromatic. Aromatic monomers can be used to raise the refractive index of the (e.g. adhesive) composition. This can be beneficial to index-match the composition to a transparent substrate to which the composition is applied. Higher refractive index compositions can also be used to cover conductive traces, such as indium-tin-oxide or metal (e.g. silver) nanowires.

In some embodiments, the refractive index of the ethylenically unsaturated (e.g. free-radically polymerizable) monomer is at least 1.50, 1.51, 1.52, 1.53, 1.54, 1.55, 1.56, 1.57, 1.58, 1.59, 1.60, 1.61, 1.62, or 1.63. The refractive index of the ethylenically unsaturated monomer is typically no greater than 1.77, 1.76, 1.75, 1.74, 1.73, 1.72, 1.71 or 1.70. Aromatic ethylenically unsaturated monomers typically comprise aromatic groups such as phenyl (e.g. biphenyl, triphenyl, etc.), naphthyl, fluorene, etc. The ethylenically unsaturated monomer may be halogenated or non-halogenated.

Inclusion of a high refractive index ethylenically unsaturated (e.g. free-radically polymerizable) monomer can raise the refractive index of the (e.g. adhesive) composition by at least 0.01, 0.02, 0.03, 0.04, 0.05 or greater.

In some embodiments, the refractive index of the (e.g. adhesive) composition before or after polymerization of the monomer is at least 1.55, 1.56, or greater. The refractive index of the (e.g. adhesive) composition is less than the refractive index of the high refractive index monomer(s). In some embodiments, the refractive index of the (e.g. adhesive) composition is no greater than 1.67, 1.66, 1.65, 1.64, 1.63, 1.62, 1.61, 1.60, 1.59, 1.58, or 1.57.

In some embodiments, the aromatic ethylenically unsaturated (e.g. free-radically polymerizable) monomers typically comprise sulfur atoms, halogen atoms (e.g. bromine), and/or at least two aromatic rings. The aromatic rings may be fused or unfused. In some embodiments, the number of aromatic rings is no greater than 6, 5, or 4.

Suitable monofunctional aromatic monomers include for example; benzyl (meth)acrylate; phenylthiol ethyl (meth) acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; 2,4-dibromo-6-sec-butylphenyl acrylate; 2,4-dibromo-6-isopropylphenyl acrylate; and 2,4,6-tribromophenyl acrylate.

In one embodiment, the composition comprises a biphenyl ethylenically unsaturated monomer having the general formula:

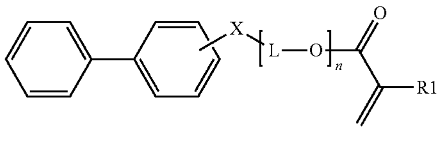

wherein R1 is H or $CH_3$;

X is O or S;

n ranges from 0 to 10 (e.g. n is 1, 2, 3, 4, 5, 6, 7, 8, 9, or 10); and

L is an alkylene group having 1 to 5 carbon atoms (i.e. methylene, ethylene, propylene, butylene, or pentylene), optionally substituted with hydroxy.

In another embodiment, the composition comprises an aromatic ethylenically unsaturated monomer having the general formula:

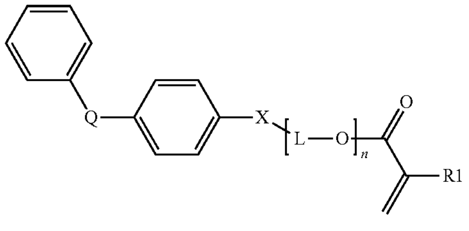

wherein R1 is H or $CH_3$;

X is O or S;

Q is selected from $C(CH_3)_2$, $CH_2$, C(O), S(O), S, and $S(O)_2$;

n ranges from 0 to 10 (e.g. n is 1, 2, 3, 4, 5, 6, 7, 8, 9, or 10); and

L is an alkylene group having 1 to 5 carbon atoms, optionally substituted with hydroxy.

One representative monomer, 2-phenyl-phenyl acrylate, is commercially available from Toagosei Co. Ltd. of Japan under the trade designation "TO-2344" is depicted as follows:

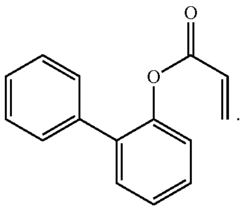 [SMILES: C=CC(=O)Oc1ccccc1-c1ccccc1]

Another biphenyl (meth)acrylate monomer is 4-(-2-phenyl-2-propyl)phenyl acrylate, available from Toagosei Co. Ltd. under the trade designation "TO-2345". Yet another biphenyl (meth)acrylate monomer, 2-phenyl-2-phenoxyethyl acrylate, available from Toagosei Co. Ltd. under the trade designation "TO-1463" and under the trade designation "M1142" from Miwon Specialty Chemical Co. Ltd., Korea, is depicted as follows:

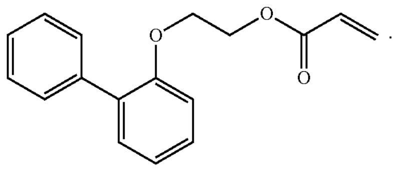 [SMILES: C=CC(=O)OCCOc1ccccc1-c1ccccc1]

In another embodiment, the composition comprises a benzyl ethylenically unsaturated monomer. Suitable benzyl (meth)acrylate monomers are described in PCT Publication No. WO2012/158317; incorporated herein by reference. The benzyl (meth)acrylate monomer typically has the general formula:

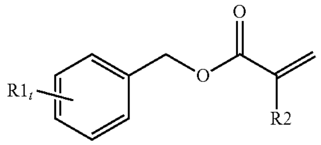

wherein at least one R1 comprises an aromatic substituent, t is an integer from 1 to 4; and R2 is hydrogen or methyl.

R1 may comprise various aromatic substituents such as

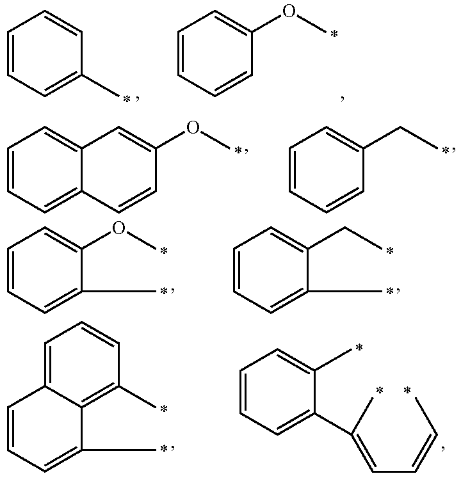

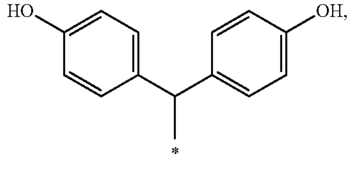

or

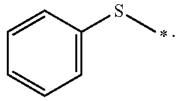

The aromatic substituent R1 is generally bonded to the aromatic ring of the benzyl group by at least one divalent (e.g. alkylene or ether) linking group. Hence, the aromatic ring of R1 is typically not fused to the aromatic benzyl ring, as in the case of naphthyl. In some embodiments, the aromatic substituent R1 is bonded to the aromatic benzyl ring by two or more divalent (e.g. alkylene or ether) linking groups.

In some favored embodiments, t is 1. Representative structures include

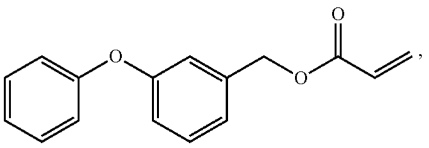

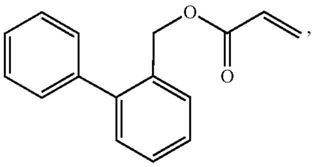

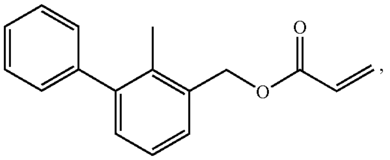

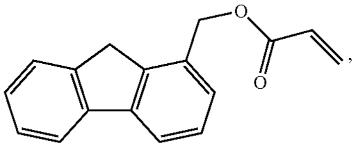

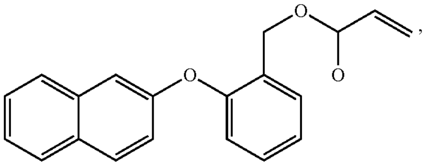

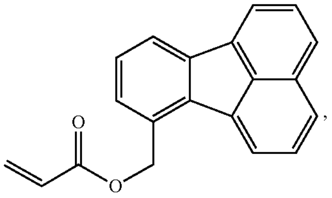

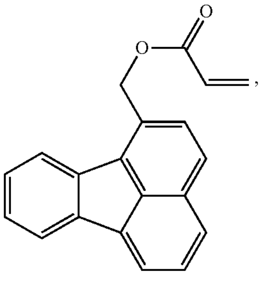

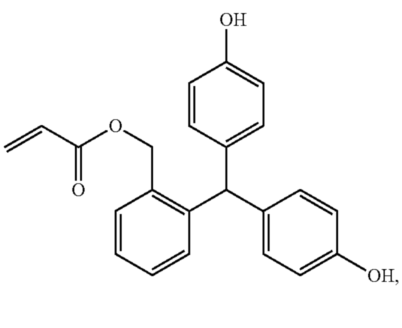

-continued

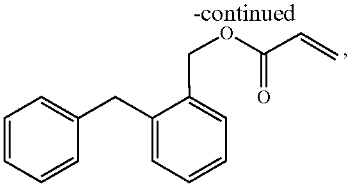

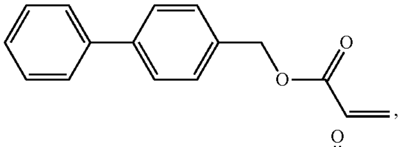

and

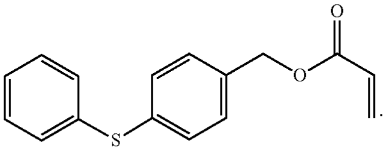

In other embodiments, t is greater than 1. For example, in one embodiment, t is 3. One representative structure is

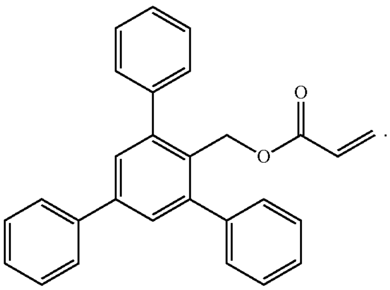 [SMILES: C=CC(=O)OCc1c(-c2ccccc2)cc(-c2ccccc2)cc1-c1ccccc1]

The aromatic multifunctional ethylenically unsaturated monomer may be synthesized or purchased. The aromatic multifunctional ethylenically unsaturated monomer typically contains a major portion, i.e. at least 60-70 wt-%, of a specific structure. It is commonly appreciated that other reaction products are also typically present as a byproduct of the synthesis of such monomers.

In some embodiments, the aromatic multifunctional ethylenically unsaturated monomer comprises a major portion having the following general structure:

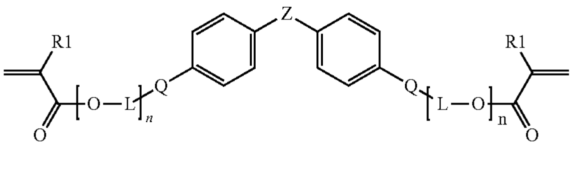

wherein Z is independently —$C(CH_3)_2$—, —$CH_2$—, —C(O)—, —S—, —S(O)—, or —$S(O)_2$—, each Q is independently O or S. L is a linking group. L may independently comprise a branched or linear $C_2$-$C_6$ alkyl group and n ranges from 0 to 10. More preferably L is $C_2$ or $C_3$ and n is 0, 1, 2 or 3. The carbon chain of the alkyl linking group may optionally be substituted with one or more hydroxy groups. For example L may be —$CH_2CH(OH)CH_2$— Typically, the linking groups are the same. R1 is independently hydrogen or methyl.

One bisphenol-A ethoxylated diacrylate monomer is commercially available from Sartomer under the trade designations "SR602" (reported to have a viscosity of 610 cps at 20° C. and a Tg of 2° C.). Another bisphenol-A ethoxylated diacrylate monomer is as commercially available from Sartomer under the trade designation "SR601" (reported to have a viscosity of 1080 cps at 20° C. and a Tg of 60° C.).

Various (meth)acrylated aromatic epoxy oligomers are commercially available. For example, (meth)acrylated aromatic epoxy, (described as a modified epoxy acrylates), are available from Sartomer, Exton, PA under the trade designation "CN118", and "CN115". (Meth)acrylated aromatic epoxy oligomer, (described as an epoxy acrylate oligomer), is available from Sartomer under the trade designation "CN2204". Further, a (meth)acrylated aromatic epoxy oligomer, (described as an epoxy novolak acrylate blended with 40% trimethylolpropane triacrylate), is available from Sartomer under the trade designation "CN112C60". One aromatic epoxy acrylate is commercially available from Sartomer under the trade designation "CN 120" (reported by the supplier to have a refractive index of 1.5556, a viscosity of 2150 at 65° C., and a Tg of 60° C.).

In some embodiments, the aromatic multifunctional ethylenically unsaturated monomer is a biphenyl multifunctional ethylenically unsaturated monomer. Such monomer may comprise a major portion having the following general structure:

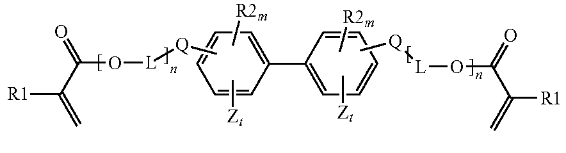

wherein each R1 is independently H or methyl;

each R2 is independently H or Br;

m ranges from 0 to 4;

each Q is independently O or S;

n ranges from 0 to 10;

L is a C2 to C12 alkylene group optionally substituted with one or more hydroxyl groups;

z is a (e.g. fused) aromatic ring; and t is independently 0 or 1.

In some embodiments, Q is preferably O. Further, n is typically 0, 1 or 2. L is typically $C_2$ or $C_3$. Alternatively, L is typically a hydroxyl substituted $C_2$ or $C_3$.

Preferably, at least one of the -Q[L-O]n C(O)C(R1)=$CH_2$ groups is substituted at the ortho or meta position. More preferably, the biphenyl di(meth)acrylate monomer comprises a sufficient amount of ortho and/or meta (meth) acrylate substituents such that the monomer is a liquid at 25° C.

Such biphenyl monomers are described in further detail in U.S. Publication No. US2008/0221291. Other biphenyl di(meth)acrylate monomer are described in the literature.

Representative structures wherein t is 0 or 1 include:

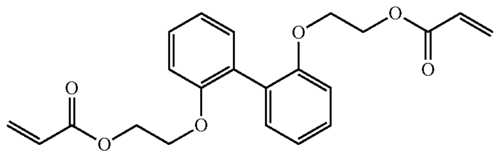

and

-continued

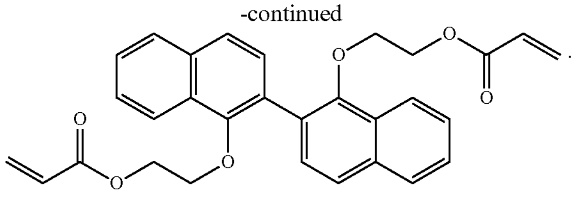

In some embodiments, the aromatic monofunctional or multifunctional ethylenically monomer is a triphenyl monomer such as described in WO2008/112452; incorporated herein by reference.

In some embodiments, the aromatic multifunctional ethylenically unsaturated monomer is a fluorene-containing multifunctional ethylenically unsaturated monomer. Such monomer may comprise a major portion having the following general structure:

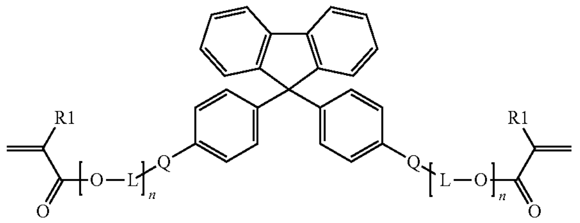

wherein each Q is independently O or S. L is a divalent linking group. L may independently comprise a branched or linear $C_2$-$C_{12}$ alkylene group and n ranges from 0 to 10. L preferably comprises a branched or linear $C_2$-$C_6$ alkylene group. More preferably L is $C_2$ or $C_3$ and n is 0, 1, 2 or 3. The carbon chain of the alkylene linking group may optionally be substituted with one or more hydroxy groups. For example L may be —$CH_2CH(OH)CH_2$—. Typically, the linking groups are the same. R1 is independently hydrogen or methyl.

One commercially available fluorene-containing multifunctional ethylenically unsaturated monomer, wherein n totals 10 (n=5) is available from Miwon as "HR6100".

Another commercially available fluorene-containing multifunctional ethylenically unsaturated monomer is 9,9-bis[4-(2-acryloyloxyethoxy)phenyl]fluorene (NK Ester A-BPEF), available from Shin-Nakamura. The structure of this monomer is shown as follows:

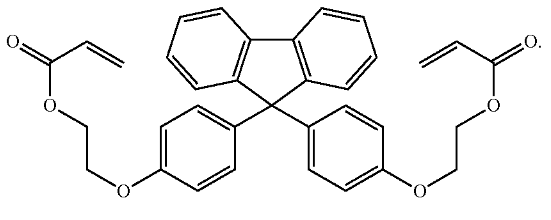 [SMILES: C=CC(=O)OCCOc1ccc(C2(c3ccc(OCCOC(=O)C=C)cc3)c3ccccc3-c3ccccc32)cc1]

In some embodiments, the (e.g. aromatic) ethylenically unsaturated (e.g. free-radically polymerizable) monomer has a specified octanol/water partition coefficient (Log P). Although various methods have been described for determining the Log P of a compound, as used herein, Log P refers to the value obtained by the Moriguchi method (See Moriguchi, I; Hirono, S; Qian, L.; Nakagome, I.; and Matsushita, Y; Chemical and Pharmaceutical Bulletin, 40

(1992): 127).). The computations were conducted utilizing the software program Molecular Modeling Pro Plus from Norgwyn Montgomery Software, Inc. (North Wales, PA).

Log P is defined as the partitioning of the concentrations of a compound in octanol versus water:

$$\text{Log } P=\text{Log}([\text{compound}]_{octanol}/[\text{compound}]_{water})$$

Higher values of Log P are more hydrophobic, while lower values of Log P are more hydrophilic. The Moriguchi method predicts Log P via a correlation developed employing over 1200 organic molecules having a wide variety of structures.

In some embodiments, the ethylenically unsaturated monomer has a Log P of at least 2.2. In some embodiments, the Log P is no greater than 10, 9.5, 9, 8.5, 8, or 7.5. When the Log P of the ethylenically unsaturated monomer is within this range, the adhesive composition can have a low haze. For example, the composition at a thickness of 50 microns has a haze of less than 3, 2.5, 2, 1, 1.5 1, or 0.5%, as determined with the test method described in the examples.

In some embodiments, the ethylenically unsaturated monomer(s) are present as an (e.g. uncured) ethylenically unsaturated monomer at the time the (e.g. adhesive) composition is applied to a substrate. In some embodiments, the ethylenically unsaturated monomer(s) are present as an (e.g. uncured) ethylenically unsaturated monomer after utilizing the (e.g. adhesive) composition is applied to a substrate. In some embodiments, the ethylenically unsaturated monomer is present as an (e.g. uncured or partially cured) ethylenically unsaturated monomer at the time the (e.g. adhesive) composition is applied to a substrate, yet the ethylenically unsaturated monomer is cured or in other words (e.g. completely) polymerized by exposure to heat or actinic radiation thereafter. In yet another embodiment, the ethylenically unsaturated monomer is cured or in other words (e.g. completely) polymerized by exposure to heat or actinic radiation) before applying the (e.g. adhesive) composition to a substrate.

When the ethylenically unsaturated monomer is partially cured, some of the monomer is polymerized and some ethylenically unsaturated monomer remains present in the composition. When the ethylenically unsaturated monomer is completely cured, substantially all the monomer is polymerized.

In some embodiments, the adhesive composition has a low water vapor transmission rate (WVTR) properties. In some embodiments, the WVTR of a 50 micron layer of the composition is less than 100, 75, or 50 grams/square meter/day (g/sq·m/day) at 40° C. and 100% relative humidity. In some embodiments, the WVTR of a 50 micron layer is less than 45, 40, 35, 30, 25, 20, 15, or 10 grams/square meter/day (g/sq·m/day) at 40° C. and 100% relative humidity. In some embodiments, the WVTR can be less than 2, 1.5, 1, 0.5, 0.2, 0.25, 0.3, 0.35, or 0.4 g/sq·m/day per micron thickness of (e.g. adhesive) composition.

In some embodiments, the adhesive has a creep compliance less than $1.5\times10^{-4}$ 1/Pa (i.e. 1.5 E-04 1/Pa) at 25° C., measured 287 seconds after a stress of 8,000 Pa was applied for 5 minutes as determined by the test method described in the examples. The lower the creep compliance, the greater the cohesive strength. In some embodiments, the creep compliance is less than 1 E-04 1/Pa, or less than 9 E-05 1/Pa, or less than 8 E-05 1/Pa, or less than 7 E-05 1/Pa, or less than 6 E-05 1/Pa, or less than 5 E-05 1/Pa, or less than 4 E-05 1/Pa, or less than 3 E-05 1/Pa, or less than 2 E-05 1/Pa, or less than 1 E-05 1/Pa. The creep compliance polyisobutyis typically at least 1 E-08 1/Pa, 1 E-07 1/Pa, or 1 E-06 1/Pa.

The (e.g. adhesive) composition may optionally comprise one or more additives such as tackifiers, plasticizers (e.g. oils, polymers that are liquids at 25° C.), antioxidants (e.g., hindered phenol compounds, phosphoric esters, or derivatives thereof), ultraviolet light absorber (e.g., benzotriazole, oxazolic acid amide, benzophenone, or derivatives thereof), in-process stabilizers, anti-corrosives, passivation agents, light stabilizers, processing assistants, elastomeric polymers (e.g. other block copolymers), scavenger fillers, nanoscale fillers, transparent fillers, desiccants, crosslinkers, pigments, organic solvents, etc. The total concentration of such additives ranges from 0-60 wt.-% of the total (e.g. adhesive) composition.

The adhesive composition optionally comprises a tackifier. In some embodiments the adhesive composition comprises a tackifier. The concentration of tackifier can vary depending on the intended (e.g. pressure sensitive) adhesive composition. In some embodiments, the amount of tackifier is at least 1, 2, 3, 4, 5, 6, 7, 8, 9, 10, 11, 12, 13, 14, 15 wt.-%. The maximum amount of tackifier is typically no greater than 60, 55, 50, 45, 40, 35, or 30 wt.-%. Increasing the (e.g. solid at 25° C.) tackifier concentration typically raises the Tg of the adhesive. In other embodiments, the adhesive composition comprises little or no tackifier. Thus, the concentration of tackifier is less than 5, 4, 3, 2, 1, 0.5, or 0.1 wt.-%.

The tackifier can have any suitable softening temperature or softening point. The softening temperature is often less than 200° C., less than 180° C., less than 160° C., less than 150° C., less than 125° C., or less than 120° C. In applications that tend to generate heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat, however, the tackifier can have a softening point less than 75° C.

Suitable tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, TX; and those available under the trade designation REGALREZ (e.g., REGALREZ 1085, 1094, 1126, 1139, 3102, and 6108) from Eastman Chemical, Kingsport, TN. The above tackifiers may be characterized as midblock tackifiers, being compatible with the isoprene block of the SIS/SI block copolymer. In some embodiments, the adhesive may comprise an endblock aromatic tackifier that is compatible with the styrene block of the block copolymer.

In some embodiments, the (e.g. adhesive) composition further comprise at least one free-radical initiator.

Useful photoinitiators include those known as useful for photocuring free-radically polyfunctional (meth)acrylates. Exemplary photoinitiators include benzoin and its derivatives such as alpha-methylbenzoin; alpha-phenylbenzoin; alpha-allylbenzoin; alpha benzylbenzoin; benzoin ethers such as benzil dimethyl ketal (e.g., 2,2-Dimethoxy-2-phenylacetophenone obtained under the trade designation of "OMNIRAD BDK" from IGM Resins USA Inc., St. Charles, IL), benzoin methyl ether, benzoin ethyl ether, benzoin n-butyl ether; acetophenone and its derivatives such as 2-hydroxy-2-methyl-1-phenyl-1-propanone (e.g., available under the trade designation OMNIRAD 1173 from IGM Resins USA Inc., St. Charles, IL) and 1-hydroxycyclohexyl phenyl ketone (e.g., available under the trade designation OMNIRAD 184 from IGM Resins USA Inc., St. Charles, IL); 2-methyl-1-[4-(methylthio)phenyl]-2-(4-morpholinyl)-1-propanone (e.g., available under the trade designation OMNIRAD 907 from IGM Resins USA Inc., St. Charles, IL); 2-benzyl-2-(dimethylamino)-1-[4-(4-morpholinyl)phenyl]-1-butanone (e.g., available under the trade designation OMNIRAD 369 from IGM Resins USA Inc., St. Charles, IL) and phosphine oxide derivatives such as ethyl-2,4,6-trimethylbenzoylphenyl phoshinate (e.g. available under the trade designation TPO-L from IGM Resins USA Inc., St. Charles, IL), and bis-(2,4,6-trimethylbenzoyl)-phenylphosphineoxide (e.g., available under the trade designation OMNIRAD 819 from IGM Resins USA Inc., St. Charles, IL).

Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis(eta5-2,4-cyclopentadien-1-yl)-bis[2,6-difluoro-3-(1H-pyrrol-1-yl) phenyl]titanium (e.g., available under the trade designation CGI 784DC from BASF, Florham Park, NJ); halomethyl-nitrobenzenes (e.g., 4-bromomethylnitrobenzene), and combinations of photoinitiators where one component is a mono- or bis-acylphosphine oxide (e.g., available under the trade designations IRGACURE 1700, IRGACURE 1800, and IRGACURE 1850 from BASF, Florham Park, NJ, and under the trade designation OMNIRAD 4265 from IGM Resins USA Inc., St. Charles, IL); and halomethyltriazine-based photoinitiators such as are 2-[2-(4-methoxy-phenyl)-vinyl]-4,6-bis-trichloromethyl [1,3,5]triazine, 2-(4-methoxy-phenyl)-4,6-bis-trichloromethyl [1,3,5]triazine, 2-(3,4-dimethoxyphenyl)-4,6-bis-trichloromethyl [1,3,5]triazine, and 2-methyl-4,6-bis-trichloromethyl [1,3,5] triazine.

In some embodiments, a thermal free-radical initiator may be used. Suitable classes of thermal, free-radical initiators include, but are not limited to thermally labile azo compounds and peroxides. Non-limiting examples of thermally labile azo compounds include those under the trade designation VAZO from the Chemours Company (Wilmington, DE), such as 2,2'-azobisisobutyronitrile, 2,2'-azobis-2-methylbutyronitrile, 2,2'-azobis-2-methylvaleronitrile, 2,2'-azobis-2,3-dimethylbutyronitrile, and combinations thereof and the like. Non-limiting examples of peroxides include, but are not limited, to organic peroxides under the trade designation LUPEROX available from Arkema Inc. (Philadelphia, PA), and include cumene hydroperoxide, methyl ethyl ketone peroxide, benzoyl peroxide, di-t-butyl peroxide, di-t-amyl peroxide, t-butyl-cumyl peroxide, dicumyl peroxide, t-butyl hydroperoxide, t-butyl peracetate, di-n-propyl peroxydicarbonate and combinations thereof and the like.

Generally, the initiator(s) are used in amounts of 0.01 to 10 parts by weight, more typically 0.1 to 2.0, parts by weight relative to 100 parts by weight of the total composition.

In some embodiments, the (e.g. adhesive) composition comprises an ultraviolet absorber (UVA) (e.g., benzotriazole) at a concentration of at least 1, 1.5, 2, 2.5, 3, 3.5, 4, 4.5, or 5 wt.-% of the adhesive composition. The concentration of the ultraviolet absorber (e.g., benzotriazole) is typically no greater than 15, 14, 13, 12, or 10 wt.-%. In some embodiments, the inclusion of the ultraviolet absorbent (e.g., benzotriazole) can reduce the transmission (e.g. of a 50 micron thick layer) at 380 and 385 nm to less than 20, 15, 10, 9, 8, 7, 6, 5, 4, 3, or 2%. In other words, the transmission can be less than 0.4%, 0.3%, 0.2%, 0.1%, 0.09%, 0.08%, 0.07%, 0.06%, 0.05% or 0.04% per micron thickness of (e.g. adhesive) composition. It has been found that relatively high concentrations of UVAs can be included without increasing yellowing, as indicated by the b* value, as measured according to the test method described in the example. In some embodiments, the b* values of a 50 micron thick layer of the (e.g. adhesive) composition is preferably less than 2, 1.5, 1 or 0.5 initially and after aging at 66° C. and 80% relative humidity for 72 hours. In other words the b* values can be less than 0.04, 0.03, 0.02, or 0.01 per micron thickness of (e.g. adhesive) composition.

When it is desired for the (e.g. adhesive) composition to be transparent, the composition is typically free of fillers having a particle size greater than 100 nm that can detract from the transparency of the adhesive composition. In this embodiment, the total amount of filler of the composition is no greater than 10, 9, 8, 7, 6, 5, 4, 3, or 2 wt.-% solids of the adhesive composition. In some favored embodiments, the composition comprises no greater than 1, 0.5, 0.1, or 0.05 wt.-% of filler.

However, in other embodiments, the (e.g. adhesive) composition may comprise higher amounts of inorganic oxide filler such as fumed silica.

In some embodiments, the compositions are prepared by dissolving the SIS/SI polymer and other optional components in an organic solvent. Suitable solvents include for example alkanes, ethyl acetate, toluene and tetrahydrofuran. In other embodiments, the compositions may be characterized as hot-melts. Such (e.g. adhesive) composition are typically applied from the melt and are solvent-free. Alternatively, a solidified hot melt or dried solvent based (e.g. adhesive) composition may be applied to a substrate or between substrates. The (e.g. adhesive) composition may be heated after application to the substrate.

The thickness of the (e.g. adhesive) composition layer is typically at least 10, 15, 20, or 25 microns (1 mil) ranging up to 500 microns (20 mils) thickness. In some embodiments, the thickness of the (e.g. adhesive) composition layer is no greater than 400, 300, 200, or 100 microns. The (e.g. adhesive) composition can be coated in single or multiple layers. The layers may be continuous or discontinuous.

In some methods of bonding or methods of making an article, the method comprises applying the composition to a substrate; and curing the (meth)acryl and/or vinyl ether groups of the ethylenically unsaturated monomer. The composition typically comprises a free-radical thermal initiator or photoinitiator, as known in the art.

The composition comprising photoinitiator may be irradiated with UV radiation having a UVA maximum in the wavelength range of 280 to 425 nanometers to polymerize the ethylenically unsaturated monomer(s). UV light sources can be of various types. Low light intensity sources, such as blacklights, generally provide intensities ranging from 0.1 or 0.5 $mW/cm^2$ (millwatts per square centimeter) to 10 $mW/cm^2$ (as measured in accordance with procedures approved by the United States National Institute of Standards and Technology as, for example, with a UVIMAP UM 365 L-S radiometer manufactured by Electronic Instrumentation & Technology, Inc., in Sterling, VA). High light intensity sources generally provide intensities greater than 10, 15, or 20 $mW/cm^2$ ranging up to 450 $mW/cm^2$ or greater. In some embodiments, high intensity light sources provide intensities up to 500, 600, 700, 800, 900 or 1000 $mW/cm^2$. UV light to polymerize the ethylenically unsaturated monomer(s) can be provided by various light sources such as light emitting diodes (LEDs), blacklights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

In some favored embodiments, the composition is a pressure sensitive adhesive. Pressure sensitive adhesives are often characterized as having a storage modulus (G') at the application temperature, typically room temperature (e.g. 25° C.), of less than $3\times10^5$ Pa (0.3 MPa) when measured at a frequency of 1 Hz. As used herein, storage modulus (G') refers to the value obtained utilizing Dynamic Mechanical Analysis (DMA) per the test method described in the examples. In some embodiments, the pressure sensitive adhesive composition has a storage modulus of less than $2\times10^5$ Pa, $1\times10^5$ Pa, $9\times10^4$ Pa, $8\times10^4$ Pa, $7\times10^4$ Pa, $6\times10^4$ Pa, $5\times10^4$ Pa, $4\times10^4$ Pa, or $3\times10^4$ Pa. In some embodiments, the composition has a storage modulus (G') of at least $2.0\times10^4$ Pa or $2.5\times10^4$ Pa. In some embodiments, the pressure sensitive adhesive has a tan delta no greater than 0.7, 0.6, 0.5, or 0.4 at 150° C. The pressure sensitive adhesive composition typically has tan delta of at least 0.01 or 0.05 at 150° C.

In some embodiments, curing the ethylenically unsaturated monomer can increase the storage modulus by at least 10,000; 20,000; 30,000; 40,000; 50,000; 60,000, or 70,000 Pa.

Pressure sensitive adhesives are often characterized as having a glass transition temperature "Tg" below 25° C.; whereas other adhesives may have a Tg of 25° C. or greater, typically ranging up to 50° C. As used herein, Tg refers to the value obtained utilizing DMA per the test method described in the examples. In some embodiments, the pressure sensitive adhesive composition has a Tg no greater than 20° C., 15° C., 10° C., 5° C., 0° C., or −5° C. The Tg of the pressure sensitive adhesive is typically at least −40° C., −35° C., −30° C., −25° C., or −20° C.

Pressure sensitive adhesive are often characterized as having adequate adhesion. In some embodiments, the peel adhesion (e.g. to glass), as measured according to the test method described in the examples, is at least 0.1, 0.5, 1, 2, 3, 4, or 5 N/cm ranging up to for example 15, 16, 17, 18, 19, or 20 N/dm.

In some embodiments, curing the ethylenically unsaturated monomer can reduce the peel adhesion to stainless steel by 1 or 2 N/dm.

As used herein, the term "adhesive" refers to a pressure sensitive adhesive or an adhesive that is not a pressure sensitive adhesive, unless specified otherwise.

The adhesive composition may be coated upon a variety of flexible and inflexible backing materials using conventional coating techniques to produce a single coated or double coated adhesive tape, and adhesive transfer tapes. Generally, adhesive transfer tapes comprise a layer of adhesive disposed on a release liner. Such products can be formed by applying (e.g., coating, casting, or extruding) the adhesive onto a release liner, and drying the adhesive if an organic solvent in present.

The tape may further comprise a release material or release liner. For example, in the case of a single-coated tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, a second layer of adhesive is disposed on the opposing surface of the backing surface. The second layer may also comprises the adhesive composition as described herein or a different adhesive composition.

Flexible substrates are defined herein as any material which is conventionally utilized as a tape backing or may be of any other flexible material. Examples include, but are not limited to polymeric films, woven or nonwoven fabrics (e.g. scrim); metal foils, foams (e.g., polyacrylic, polyethylene, polyurethane, neoprene), and combinations thereof (e.g. metalized polymeric film). Polymeric film include for example polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, and ethyl cellulose. The woven or nonwoven fabric may comprise fibers or filaments of synthetic or natural materials such as cellulose (e.g. tissue), cotton, nylon, rayon, glass, ceramic materials, and the like.

A substrate may be bonded by the adhesive composition or (e.g. transfer, single-sided, or double-coated tape described herein. The substrate may comprise the same materials as just described for the backing.

One method of bonding comprises providing a first substrate and contacting a surface of the first substrate with the (e.g. pressure sensitive) adhesive composition. In this embodiment, the opposing surface of the adhesive is typically temporarily covered by a release liner.

In other embodiments, the method further comprises contacting the opposing surface of the (e.g. pressure sensitive) adhesive (e.g. layer) to a second substrate. The first and second substrate may be comprised of various materials as previously described such as metal, an inorganic material (e.g. glass), an organic polymeric material, or a combination thereof.

In some methods of bonding, the substrate, (e.g. pressure sensitive) adhesive composition, or combination thereof may be heated to reduce the storage modulus (G') and thereby increase the bond strength formation. The substrate and/or (e.g. pressure sensitive) adhesive may be heated to a temperature up to 30, or 35, or 40, or 45, or 50, or 55, or 60, or 65 or 70° C. In some embodiments, the substrate(s) together with the adhesive bonded to the substrate(s) by means of the initial peel adhesion strength at ambient temperature (e.g. 25° C.) is heated in an oven to the desired temperature. In other embodiments, the substrate and/or (e.g. pressure sensitive) adhesive is heated by means of a hot air gun.

In some embodiments, the composition described herein is optically clear. Thus, certain articles can be laminates that include an optically clear substrate (e.g., an optical substrate such as an optical film) and an optically clear adhesive layer or coating disposed on at least one major surface of the optically clear substrate. The laminates can further include a second substrate permanently or temporarily attached to the pressure-sensitive adhesive layer and with the pressure-sensitive adhesive layer being positioned between the optically clear substrate and the second substrate.

In one embodiment, the laminate may be a removable or permanent surface protection film. In some embodiments, the tapes and protective films can be utilized for (e.g. illuminated) displays that can be incorporated into household appliances, automobiles, computers (e.g. tablets), and various hand-held devices (e.g. phones). In other embodiments, the adhesive coated film may be suitable for architectural applications, glazing (e.g., windows and windshields), and graphic film applications.

In some embodiments, the (e.g. adhesive) composition and optically clear substrate (e.g. transparent film) have a transmission as measured according to the test method described in the examples of visible light (410 nm) of at least 90 percent for a layer of adhesive having a thickness of 50 micrometers. In some embodiments, the transmission is at least 91, 92, 93, 94, 95, 96, 97, 98, or 99%.

In some example laminates in which an optically clear pressure-sensitive adhesive layer is positioned between two substrates, at least one of the substrates is an optical film, a display unit (e.g., liquid crystal displays (LCDs), organic light emitting displays (OLEDs), a touch sensor, or a lens. Optical films intentionally enhance, manipulate, control, maintain, transmit, reflect, refract, absorb, retard, or otherwise alter light that impinges upon a surface of the optical film. Optical films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Optical films for the provided laminates can also include retarder plates such as quarter-wave and half-wave phase retardation optical elements. Other optically clear films can include clear plastics (such as polyester, cyclic olefin copolymer, clear polyimide, polycarbonate, or polymethylmethacrylate), anti-splinter films, and electromagnetic interference filters. Some of these films may also be used as substrates for ITO (i.e., indium tin oxide) coating or patterning, such as use those used for the fabrication of touch sensors. The low water uptake and WVTR of the adhesives described herein provide a stable, low dielectric constant OCA which can be very advantageous for use in touch sensor applications, both to protect the sensor and integrating conductors from the environment and corrosion, and also to minimize electronic noise communication with the sensor. In some embodiments, the (e.g. pressure sensitive) adhesive and (e.g. transfer and double-coated) tapes described herein are suitable for bonding internal components or external components of an optical elements such as illuminated display devices such as liquid crystal displays ("LCDs") and light emitting diode ("LEDs") displays such as cell phones (including Smart phones), wearable (e.g. wrist) devices, car navigation systems, global positioning systems, depth finders, computer monitors, notebook and tablet computer displays. Other types of optical elements include projection (e.g. lens) components, photonic components, and polarizing beam splitters.

In some embodiments, the composition is suitable for use as an encapsulating composition for use in an electronic device as described for example in US2009/0026924; incorporated herein by reference.

Specifically, the (e.g. pressure sensitive) adhesive can be used as a sealing member for electronic devices, for example, organic devices such as an organic transistor, an organic memory, and an organic EL element; liquid crystal displays; electronic paper; thin film transistors; electrochromic devices; electrochemical light-emitting devices; touch panels; solar batteries; thermoelectric conversion devices; piezoelectric conversion devices; electric storage devices; and the like.

Examples

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. Tables 1 (below) lists materials used in the examples and their sources.

TABLE 1

Materials

| DESIGNATION | DESCRIPTION | SOURCE |
|---|---|---|
| SIS | Styrene-isoprene-styrene elastomer D1340 | Kraton, Houston, TX |
| Oil | Paralux Process Oil 6001 | Chevron Products Company, San Ramon, CA |
| E5300 | Cycloaliphatic hydrocarbon resin obtained under the trade designation ESCOREZ 5300 | Exxonmobil, Houston, TX, USA |
| M1192 | Biphenylmethyl acrylate obtained under the trade designation MIRAMER M1192H | Miwon Specialty Chemical Co., Gyeonggi-do, South Korea |
| BNP | [1,1'-binaphthalene]-2,2'-diylbis(oxy))bis(ethane-2,1-diyl) diacrylate available as KAYARAD BNP-1 from Nippon Kayaku Co. Ltd. Tokyo, Japan | Nippon Kayaku Co. Ltd., Tokyo, Japan |

TABLE 1-continued

| Materials | | |
|---|---|---|
| DESIGNATION | DESCRIPTION | SOURCE |
| | 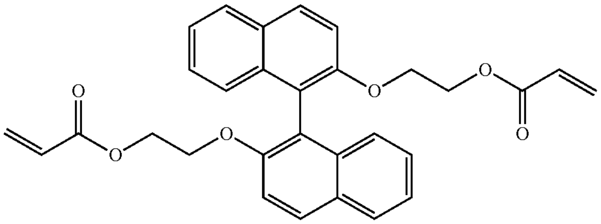 [SMILES: C=CC(=O)OCCOc1ccc2ccccc2c1-c1c(OCCOC(=O)C=C)ccc2ccccc12] | |
| SR833 | Tricyclodecane dimethanol diacrylate obtained under the trade designation SR833 S | Sartomer, Exton, PA |
| PTPBA | Para-thiophenoxybenzylacrylate | Synthesis 1 of PCT/IB2017/058440 |
| TPO-L | Trimethylbenzoylphenylphosphinsaeureethylester | BASF Corporation |
| RF22N | Release liner obtained under the trade designation RF 22N | SKC Haas, Cheonan-si, South Korea |
| RF02N | Release liner obtained under the trade designation RF 02N | SKC Haas |
| Toluene | Toluene (solvent) | EMD Millipore Corp., Billerica, MA, USA |
| 2-EHA | 2- Ethylhexyl acrylate | Sigma-Aldrich, St. Louis, MO, USA |
| IBOA | Isobornyl acrylate | Sartomer, Exton, PA, USA |
| HEA | 2-Hydroxyethyl acrylate | BASF Corporation |
| D1173 | Photoinitiator; 2-hydroxy-2-methyl-1-phenyl propan-1-one, obtained under the trade designation Darocur 1173 | BASF Corporation |
| I651 | Photoinitiator, 2,2-dimethoxy-2-phenylacetophenone, obtained under the trade designation IRGACURE 651 | BASF Corporation |
| HDDA | Hexanedioldiacrylate | Sigma-Aldrich |
| SR340 | 2-phenoxyethyl methacrylate | Sartomer, Exton, PA, USA |
| PHPM | 3-phenoxy-2-hydroxypropyl methacrylate | Polysciences Inc., Warrington, PA |
| SR339 | 2-phenoxyethyl acrylate | Sartomer, Exton, PA, USA |
| OPPEA | o-Phenylphenol acrylate | KPX Green chemical, Seoul Korea |
| CVE | Cyclohexyl vinyl ether | Sigma-Aldrich, Milwaukee, WI, USA |
| SR492 | Propoxylated trimethylpropane triacrylate | Sartomer, Exton, PA, USA |
| HR6100 | Bisphenol fluorene diacrylate with 10 ethylene oxide groups (Log P = 3.81) | Miwon, Korea |
| CN309 | Hydrophobic acrylate ester (Log P = 7.31) | Sartomer |
| DBES | bis(4-(but-3-en-1-ylthio)phenyl)sulfane | As described in WO2019/021115 |
| D0241 | Blend of bisphenol fluorene diacrylate with 2 ethylene oxide group (60% by weight) with o-phenylphenol (EO) acrylate (OPPEA) (40% by weight) | |

TABLE 2
| Refractive index, Log P and structures of monomers | | | |
|---|---|---|---|
| DESIGNATION | RI (of uncured material) | Moriguchi Log P | Structure |
| M1192H | 1.598 | 3.3 | 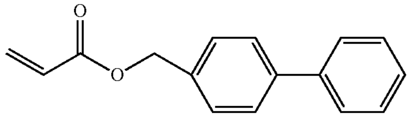 [SMILES: C=CC(=O)OCc1ccc(-c2ccccc2)cc1] |
| BNP-1 | 1.633 | 3.6 | 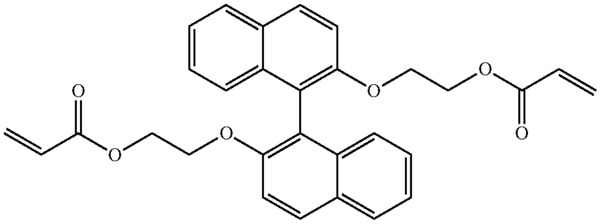 [SMILES: C=CC(=O)OCCOc1ccc2ccccc2c1-c1c(OCCOC(=O)C=C)ccc2ccccc12] |
| SR833S | 1.504 | 2.8 | 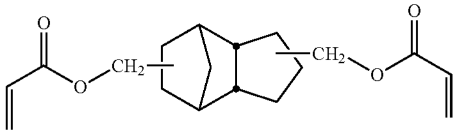 |
| PTPBA | 1.604 | 3.8 | 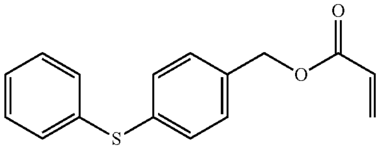 [SMILES: C=CC(=O)OCc1ccc(Sc2ccccc2)cc1] |
| HDDA | 1.456[a] | 2.0 | 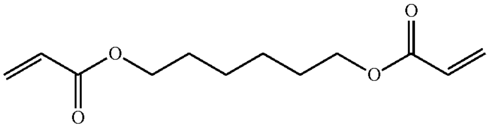 [SMILES: C=CC(=O)OCCCCCCOC(=O)C=C] |
| SR340 | 1.5109[c] | 2.1 | 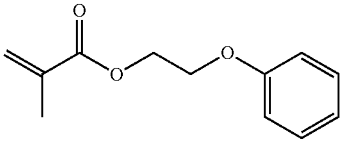 |
| SR339 | 1.516[c] | 1.8 | 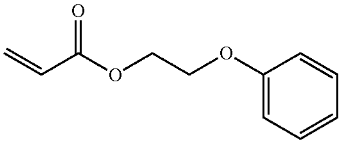 |

TABLE 2-continued

Refractive index, Log P and structures of monomers

| DESIGNATION | RI (of uncured material) | Moriguchi Log P | Structure |
|---|---|---|---|
| SR492 | 1.459 | 1.6 | 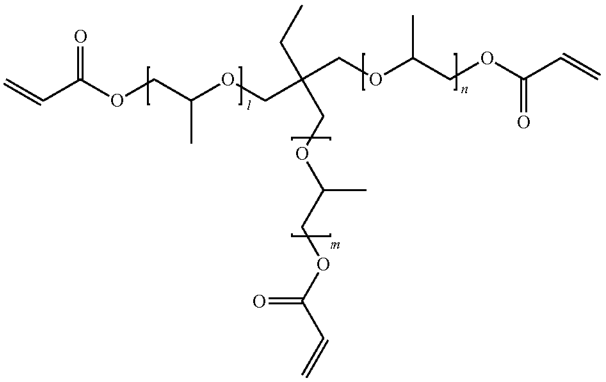 l, m, and n = 1 |
| PHPM | 1.521 | 1.6 | 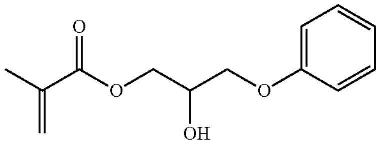 [SMILES: C=C(C)C(=O)OCC(O)COc1ccccc1] |
| OPPEA | 1.578 | 3.0 | 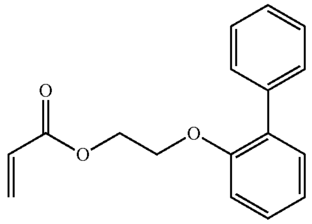 [SMILES: C=CC(=O)OCCOc1ccccc1-c1ccccc1] |
| CVE | 1.454[a] | 1.7 | 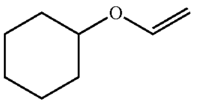 |
| DBES | 1.637-1.653 | | 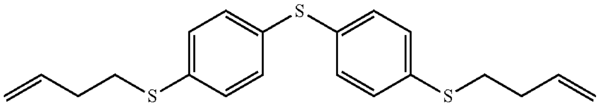 [SMILES: C=CCCSc1ccc(Sc2ccc(SCCC=C)cc2)cc1] |
| D0241 | 1.600 | | |

[a]Obtained from Sigma Aldrich technical data sheet;
[b]Obtained from BASF technical data sheet;
[c]Obtained from Sartomer technical data sheet Test Methods Method for Determining Log P Log water octanol partition coefficient was calculated by the Moriguchi method implemented in the software program Molecular Modeling Pro Plus, Version 6.2.6, Norgwyn Montgomery Software Inc. (North Wales, PA, USA)

Method for Haze Measurement

Test specimens were prepared by cleaning the LCD (liquid crystal display) glass three times with IPA (isopropyl alcohol) and completely drying the surface with a KIMWIPE (KIMTECH by Kimberly-Clark, Irving, TX, USA). Each test specimen was cut (e.g. 50 microns thickness) to a size large enough to cover the entrance port. The clear liner was removed and the adhesive was laminated on the LCD glass with four passes of a small rubber hand roller. The sample should be free of visible distinct internal voids, particles, scratches, and blemishes. Then test sample was then placed in a 65° C., 90% relative humidity testing chamber. In 10 minutes, the other clear liner was removed and the haze was measured according to ASTM D 1003-92 (1992) against the background of the LCD glass with UltraScan Pro (Hunterlab, Reston, VA, USA) equipped with a visible light source.

Method for Determination of the Water Vapor Transmission Rate (WVTR)

Water Vapor Transmission Rate was measured according to ASTM F-1249 (1990). The sample area was 50 square centimeters ($cm^2$). Samples were prepared by placing a 2 mil (50 micron) slab of adhesive between two porous polypropylene films (Example 2 of U.S. Pat. No. 5,238,623). The prepared samples were then placed in the PERMA IRAN-W Model 700 instrument (Mocon Inc., Brooklyn Park, MN, USA) for testing at 40° C. and 100% relative humidity gradient.

Method for Determining Refractive Index (RI)

The refractive indices (RI) of the samples were measured on a Metricon 2010/M (Metricon Corp, Melbourne, Australia). Samples were prepared by removing one release liner from the adhesive transfer tapes (prepared as described below) and then bringing the sample (e.g. 50 microns thickness) into contact with the prism and exposing the sample to a 532 nanometers (nm) (green) laser. Three readings were collected per sample. The values reported are the average of the three measurements. An increase of 0.001 is considered significant.

Method for Peel Adhesion Strength

Peel adhesion strength was measured at an angle of 180° using an IMASS SP-200 slip/peel tester (available from IMASS, Incorporated, Accord, MA) at a peel rate of 305 millimeters/minute (12 inches/minute). Test panels (glass) measuring 25.4 centimeters by 12.7 centimeters (10 inches by 5 inches) were cleaned by wiping them with isopropanol using a lint-free tissue and allowing them to air dry for 30 minutes after which they were clamped to the test stage of the peel tester. Tape samples (prepared by coating a 50 micron thick PET film as described in CE-1) measuring approximately 1.3 centimeters by 20 centimeters (0.5 inches by 8 inches) were then applied to the cleaned test panels with the adhesive side in contact with the test panel. The tape samples were then rolled over using a 2.0 kilogram (4.5 pound) rubber roller one time in each direction. The taped panels were stored and tested at 23° C. and 50% relative humidity (RH). Testing was conducted 20 minutes after preparation. Three to five taped panels were evaluated and the average peel adhesion strength of the total number of panel tested was reported. Results were obtained in ounces/inch and converted to Newtons/decimeter (N/cm). In addition, it was noted if any adhesive residue remained on the panel after removal of the tape sample.

Method for Storage Modulus and Tan Delta as Determined by Dynamic Mechanical Analysis Dynamic mechanical analysis ("DMA") of adhesive samples was carried out using a rheometer (obtained from TA Instruments, New Castle, DE, under the trade designation "AR2000 PARALLEL PLATE RHEOMETER") to characterize the physical properties of each sample as a function of temperature. For each sample, 50 micrometer thick sheets of the polymerized adhesive sample were laminated together to achieve a 1 mm thick slab. A circular punch with a diameter of 8 mm was used to cut a sample from this slab which was then centered between the 8 mm diameter parallel plates of the rheometer. The temperature was then scanned from −40° C. to 150° C. at a rate of 3° C./min. while the parallel plates were oscillated at a frequency of 1 Hz and a constant strain of 0.4%. Physical parameters of the material were recorded during the temperature ramp, including storage modulus (G') and tan delta at 150° C.

Sample Preparation

For preparing samples, materials (A*, Escorez, Oil, TPO-L, and Additives as shown in Table 2) were added in a glass vial with Toluene to make a solution with 40% solids. The vial was sealed and contents were mixed overnight. The solution was then coated on a 50 μm thick siliconized polyester release liner, RF22N (SKC Haas, Korea) using a knife coater with a gap of 6 mil. The coated sample was placed in an oven at 70° C. for 15 minutes. For crosslinking the samples, the coated sample was exposed to the UV radiation: UVA of 2 $J/cm^2$, UVB of 1.7 $J/cm^2$, UVC of 0.5 $J/cm^2$.

TABLE 3

| Compositions | | | | | | |
|---|---|---|---|---|---|---|
| Example | SIS (g) | Escorez (g) | Oil (g) | Monomer (0.4 g) | Monomer Log P (calculated) | TPO-L (g) |
| CE 1 | 6 | 4 | | | | |
| CE 2 | 6 | 4 | 2 | | | |
| E 1 | 6 | 4 | 0 | CN309 | 7.31 | 0.05 |
| E 2 | 6 | 4 | 2 | CN309 | 7.31 | 0.05 |
| E 3 | 6 | 4 | | SR833 | 2.79 | 0.05 |
| E 4 | 6 | 4 | | M1192 | 3.28 | 0.05 |
| E 5 | 6 | 4 | | BNP | 3.56 | 0.05 |
| E 6 | 6 | 4 | | PTPBA | 3.82 | 0.05 |
| E 7 | 6 | 4 | | OPPEA | 2.95 | 0.05 |
| E 8 | 6 | 4 | | HR6100 | 3.81 | 0.05 |
| E 9 | 6 | 4 | | DBES | 6.38 | 0.05 |
| E 10 | 6 | 4 | | D0241 | 3.55 | 0.05 |

TABLE 3A

| Properties | | | | | | |
|---|---|---|---|---|---|---|
| Ex. | Monomer | Monomer Log P | Haze | RI* | RI** | tan δ @150° C. |
| CE 1 | | | 0.29 | 1.5625 | NA | 0.6 |
| CE 2 | | | 0.26 | 1.5493 | NA | |
| E 1 | CN309 | 7.31 | 0.3 | 1.5598 | 1.5601 | 0.16 |
| E 2 | CN309 | 7.31 | 0.23 | 1.5479 | 1.5481 | |
| E 3 | SR833 | 2.79 | 0.29 | 1.5614 | 1.5616 | |
| E 4 | M1192 | 3.28 | 0.35 | 1.5651 | 1.5655 | 0.13 |
| E 5 | BNP | 3.56 | 2.74 | 1.5669 | 1.5671 | |
| E 6 | PTPBA | 3.82 | 0.31 | 1.5654 | 1.5656 | |
| E 7 | OPPEA | 2.95 | 0.32 | 1.564 | 1.5645 | |
| E 8 | HR6100 | 3.81 | 0.85 | 1.5632 | 1.5634 | |
| E 9 | DBES | 6.38 | 0.3 | 1.5676 | 1.5687 | 0.17 |
| E 10 | D0241 | 3.55 | 0.33 | 1.5636 | 1.5642 | |

*prior to polymerization of the monomer
**after polymerization of the monomer

TABLE 3B

| Properties | | | | | |
|---|---|---|---|---|---|
| Ex. | Monomer | Monomer Log P | WVTR ($g/m^2$/day) | Peel force (N/cm) | G'@25 C. (Pa) |
| CE 1 | | | 33.2 | | |
| CE 2 | | | | 11.23 | 161231 |
| E 1 | CN309 | 7.31 | 36.1 | 6.17 | |
| E 2 | CN309 | 7.31 | | 8.93 | 179876 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising:

at least 20 wt. % of block copolymer comprising polyvinyl aromatic end blocks and a polyisoprene midblock; and at least one ethylenically unsaturated aromatic monomer comprising one or more groups selected from (meth) acryl or vinyl ether, wherein the monomer has a Log P according to Moriguchi's method of at least 2.2 and the monomer is present is an amount no greater than 20 wt.-% of the composition; and tackifier.

2. The composition of claim 1 wherein the at least one ethylenically unsaturated aromatic monomer is a monofunctional ethylenically unsaturated monomer.

3. The composition of claim 1 wherein the at least one ethylenically unsaturated aromatic monomer is a multifunctional ethylenically unsaturated monomer.

4. The composition of claim 1 wherein the at least one ethylenically unsaturated monomer is aromatic and has a refractive index greater than 1.51, 1.55, or 1.60.

5. The composition of claim 1 wherein the composition comprises styrene-isoprene-styrene (SIS) block copolymer.

6. The composition of claim 5 wherein the SIS block copolymer has a multi-arm structure.

7. The composition of claim 5 wherein the SIS block copolymer has a styrene content no greater than 15 wt-%.

8. The composition of claim 1 wherein the composition further comprises at least one free-radical initiator.

9. The composition of claim 1 wherein the composition at a thickness of 50 microns has a haze of less than 3, 2.5, 2, 1, 1.5, 1, or 0.5%.

10. The composition of claim 1 wherein the composition at a thickness of 50 microns has a water vapor transmission rate of less than 100 g/$m^2$ day at 40° C. and 100% relative humidity.

11. The composition of claim 1 wherein the composition is an adhesive.

12. The composition of claim 1 wherein the composition is a pressure sensitive adhesive having a storage modulus G' of less than 0.3 MPa at a temperature of 25° C. and a frequency of 1 hertz.

13. The composition of claim 1 wherein the at least one ethylenically unsaturated monomer comprises a monofunctional ethylenically unsaturated monomer and a multifunctional ethylenically unsaturated monomer.

14. The composition of claim 1 wherein the at least one aromatic ethylenically unsaturated monomer is present in an amount of 1 to 15 wt. % of the composition.

15. The composition of claim 1 wherein the at least one ethylenically unsaturated aromatic monomer is present in an amount of 1 to 10 wt. % of the composition.

16. A composition consisting of:

at least 20 wt. % of block copolymer comprising polyvinyl aromatic end blocks and a polyisoprene midblock; and at least one ethylenically unsaturated aromatic monomer comprising one or more groups selected from (meth) acryl or vinyl ether, wherein the monomer has a Log P according to Moriguchi's method of at least 2.2 and the monomer is present is an amount no greater than 20 wt.-% of the composition;

free-radical initiator;

tackifier; and optional additives selected from antioxidants, ultraviolet absorbers, light stabilizers, fillers, pigments, and crosslinkers.

17. A composition comprising:

at least 20 wt. % of block copolymer comprising polyvinyl aromatic end blocks and a polyisoprene midblock; and at least one ethylenically unsaturated aromatic monomer comprising one or more groups selected from (meth) acryl or vinyl ether, wherein the monomer has a Log P according to Moriguchi's method of at least 2.2 and the monomer is present is an amount of 1 to 10 wt.-% of the composition.

18. An article comprising:

a substrate; and a composition disposed on the substrate;

wherein the composition comprises at least 20 wt. % of block copolymer comprising polyvinyl aromatic end blocks and a polyisoprene midblock; and at least one ethylenically unsaturated aromatic monomer comprising one or more groups selected from (meth) acryl or vinyl ether, wherein the monomer has a Log P according to Moriguchi's method of at least 2.2 and the monomer is present is an amount no greater than 20 wt.-% of the composition.

19. The article of claim 18 wherein the composition further comprises tackifier.

20. The article of claim 18 wherein the substrate is a release liner, a film, or an electronic component.

21. A method of bonding comprising:

providing the article of claim 20; and bonding the substrate to a second substrate or surface with the composition.

* * * * *